US012598362B2

(12) United States Patent
Sodagar

(10) Patent No.: US 12,598,362 B2
(45) Date of Patent: Apr. 7, 2026

(54) METHOD FOR SIGNALING HAPTIC INFORMATION FOR DASH SELECTION PROCESS BY USING INITIALIZATION SEGMENTS

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/767,053

(22) Filed: Jul. 9, 2024

(65) Prior Publication Data

US 2025/0024115 A1     Jan. 16, 2025

Related U.S. Application Data

(60) Provisional application No. 63/543,261, filed on Oct. 9, 2023, provisional application No. 63/526,156, filed on Jul. 11, 2023, provisional application No. 63/526,146, filed on Jul. 11, 2023, provisional application No. 63/526,154, filed on Jul. 11, 2023, provisional application No. 63/526,147, filed on Jul. 11, 2023.

(51) Int. Cl.
*H04N 21/81* (2011.01)
*H04N 21/235* (2011.01)

(52) U.S. Cl.
CPC ........... *H04N 21/81* (2013.01); *H04N 21/235* (2013.01)

(58) Field of Classification Search
CPC ............................. H04N 21/81; H04N 21/235
See application file for complete search history.

(56) References Cited

U.S. PATENT DOCUMENTS

| | | | |
|---|---|---|---|
| 2020/0137137 A1 | 4/2020 | Rehan et al. | |
| 2020/0177809 A1 | 6/2020 | Hannuksela | |
| 2020/0358838 A1 | 11/2020 | Wang et al. | |
| 2021/0006871 A1* | 1/2021 | Sodagar | H04N 21/858 |
| 2021/0021909 A1* | 1/2021 | Wang | H04N 21/85406 |

(Continued)

OTHER PUBLICATIONS

"Text for Committee Draft of ISO/IEC 23090-31: Haptics Coding." MPEG, Nov. 14, 2022, www.mpeg.org/standards/MPEG-I/31/. Accessed Aug. 5, 2025. (Year: 2022).*

(Continued)

*Primary Examiner* — Randy A Flynn
(74) *Attorney, Agent, or Firm* — Sughrue Mion, PLLC

(57) ABSTRACT

There is included a method and apparatus comprising computer code configured to cause a processor or processors to, by a dynamic adaptive streaming over hypertext transfer protocol (HTTP) (DASH) application implemented by the processor or processors, implement receiving a media file having haptics indicated by an adaptation set of a DASH media presentation description (MPD) manifest, parsing any of avatars, perceptions, channels, and band identifiers, of the haptics, selecting a subset of haptic adaptation sets, including the adaptation set based on parsing any of the avatars, the perceptions, the channels and the band identifiers, and streaming and rendering, in DASH, haptic feedbacks of the media file based on the selected subset of the haptic adaptation sets.

8 Claims, 13 Drawing Sheets

(56) References Cited

U.S. PATENT DOCUMENTS

2021/0021911 A1\*  1/2021  Ting ..................... H04N 21/235
2021/0397260 A1\*  12/2021  Birnbaum .............. H04L 51/06

OTHER PUBLICATIONS

Muthusamy, Yeshwant, and Philippe Guillotel. "Overview of Haptics Standardization Web3D 2022—Paper #37." Web3D 2022—Detailed Program, Nov. 3, 2022, web3d.siggraph.org/archive/web3d2022/wp-content/uploads/2022/11/Web3D_Presentation_37_muthusamy.pdf. Accessed Aug. 5, 2025. (Year: 2022).\*
Written Opinion of the International Searching Authority Dated Sep. 26, 2024 in International Application No. PCT/US2024/037513.
International Search Report dated Sep. 26, 2024 in Application No. PCT/US2024/037513.
"Information technology—Dynamic adaptive streaming over HTTP (DASH)—Part 1: Media presentation description and segment formats", ISO/IEC 23009-1:2022(E), Aug. 2022, 328 pages.

\* cited by examiner

Figure 13:
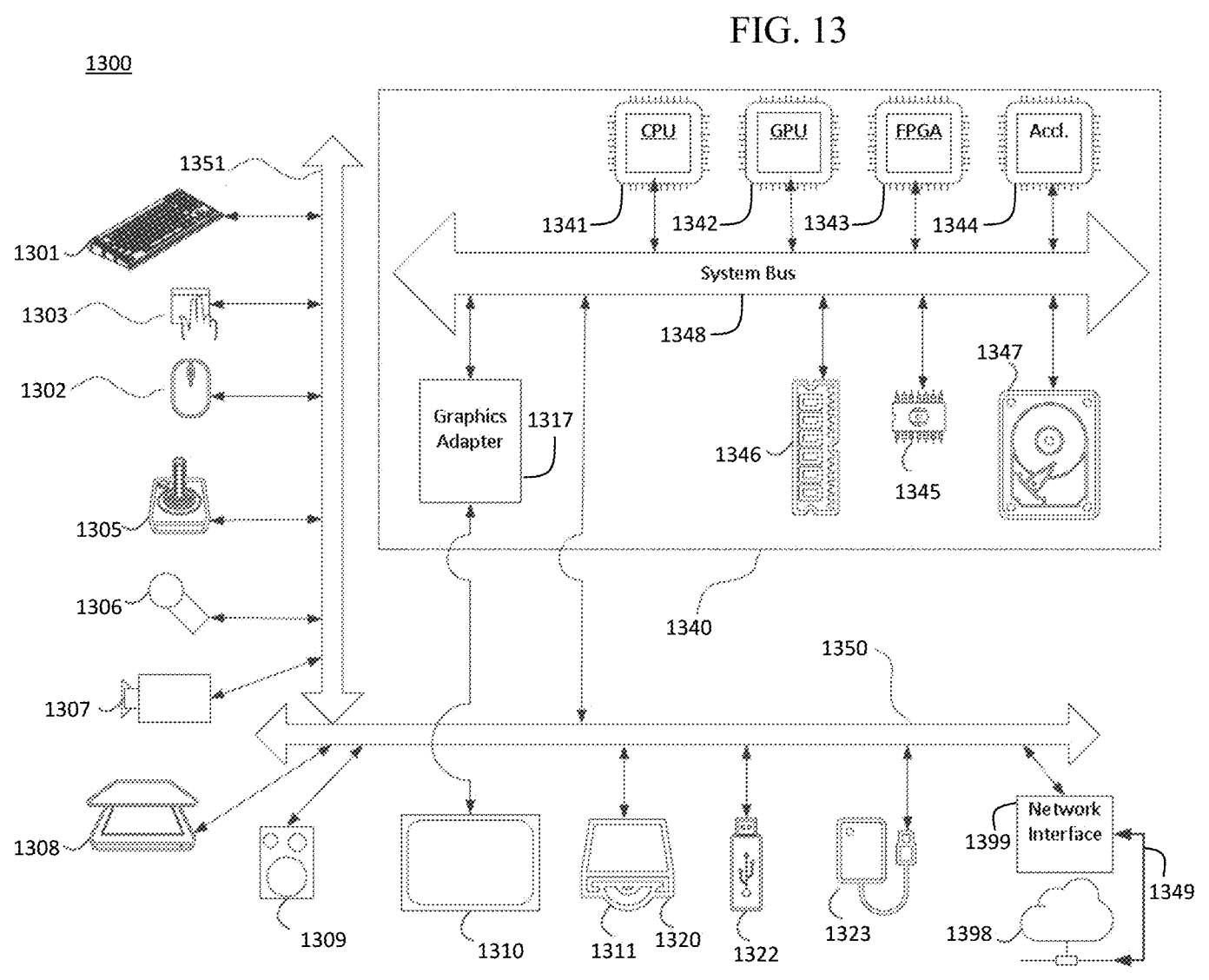

System Bus

CPU 1341
GPU 1342
FPGA 1343
Accl. 1344

1348
1346
1345
1347

Graphics Adapter 1317

1340
1350

1349
Network Interface 1399
1398

1323
1322
1320
1311
1310
1309

1351
1301
1303
1302
1305
1306
1307
1308

METHOD FOR SIGNALING HAPTIC INFORMATION FOR DASH SELECTION PROCESS BY USING INITIALIZATION SEGMENTS

CROSS REFERENCE TO RELATED APPLICATION

The present application claims priority to each of U.S. provisional application 63/526,146, filed on Jul. 11, 2023, U.S. 63/526,147, filed on Jul. 11, 2023, U.S. 63/526,156, filed on Jul. 11, 2023, U.S. 63/526,154, filed on Jul. 11, 2023, and U.S. 63/543,261, filed on Oct. 9, 2023, the contents of which are hereby expressly incorporated by reference, in their entireties, into the present application.

BACKGROUND

1. Field

This disclosure provides for signaling, at least at any of high- and mid-levels, haptics experience configuration in the DASH manifest for the selection of the right adaptation sets.

2. Description of Related Art

Haptics experience has become a part of multimedia presentation. In such an application, the haptic signals are delivered to the device or wearable and the user feels the haptic sensations during the use of the application. Recently, MPEG has started working on a compression standard for haptics.

MPEG also published the DASH standard for internet media streaming. Recently MPEG has been investigating the use of DASH for streaming haptic experiences as part of or the entire multimedia presentation.

MPEG DASH provides a standard for streaming multimedia content over IP networks. While the DASH standard provides a way to describe various content and their relation, it does not provide explicit support for haptic streaming, especially when there are multiple haptic tracks to choose from.

And for any of those reasons there is therefore a desire for technical solutions to such problems that arose in computer audio technology.

SUMMARY

To address those technical problems, there is included a method and apparatus comprising memory configured to store computer program code and a processor or processors configured to access the computer program code and operate as instructed by the computer program code. The computer program is configured to cause the processor or processors to implement, for haptics processing a dynamic adaptive streaming over hypertext transfer protocol (HTTP) (DASH) application implemented by the processor or processors, receiving code configured to cause the at least one processor to receive a media file comprising haptics indicated by an adaptation set of a DASH MPD manifest; parsing code configured to cause the at least one processor to parse any of avatars, perceptions, channels, and band identifiers, of the haptics; selecting code configured to cause the at least one processor to select a subset of haptic adaptation sets, including the adaptation set based on parsing any of the avatars, the perceptions, the channels and the band identifiers; and streaming and rendering code configured to cause the at least one processor to stream and render, in DASH, haptic feedbacks of the media file based on the selected subset of the haptic adaptation sets The DASH application may be configured to command a DASH client to stream from the selected subset of the haptic adaptation sets The DASH application may receive the media file from the DASH client The media file may further indicate the haptics by a haptics interchange format (HJIF) configuration file.

The media file may further indicate the haptics by referencing a link to the HJIF file.

The media file may further indicate the haptics by a haptics interchange format (HJIF) configuration object.

The media file may further indicate the haptics by an extensible markup language (XML) element.

BRIEF DESCRIPTION OF THE DRAWINGS

Further features, nature, and various advantages of the disclosed subject matter will be more apparent from the following detailed description and the accompanying drawings in which:

FIG. 2 is a simplified schematic illustration of media processing in accordance with embodiments;

FIG. 13 is a simplified block diagram of a computer environment in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
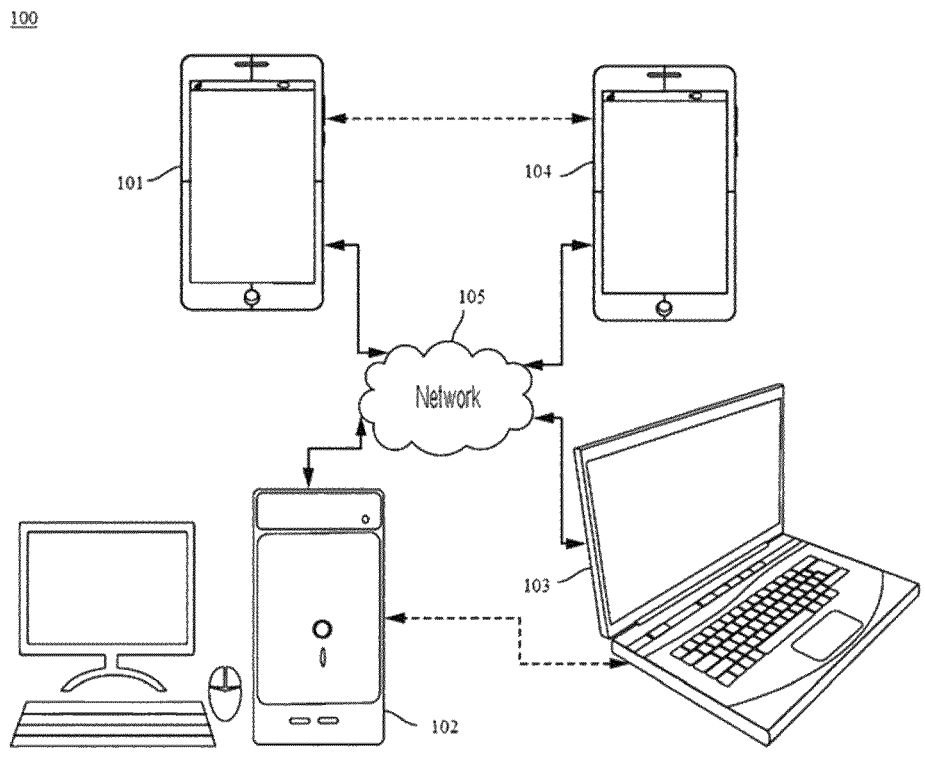
FIG. 1 is a simplified schematic illustration of a computer environment in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
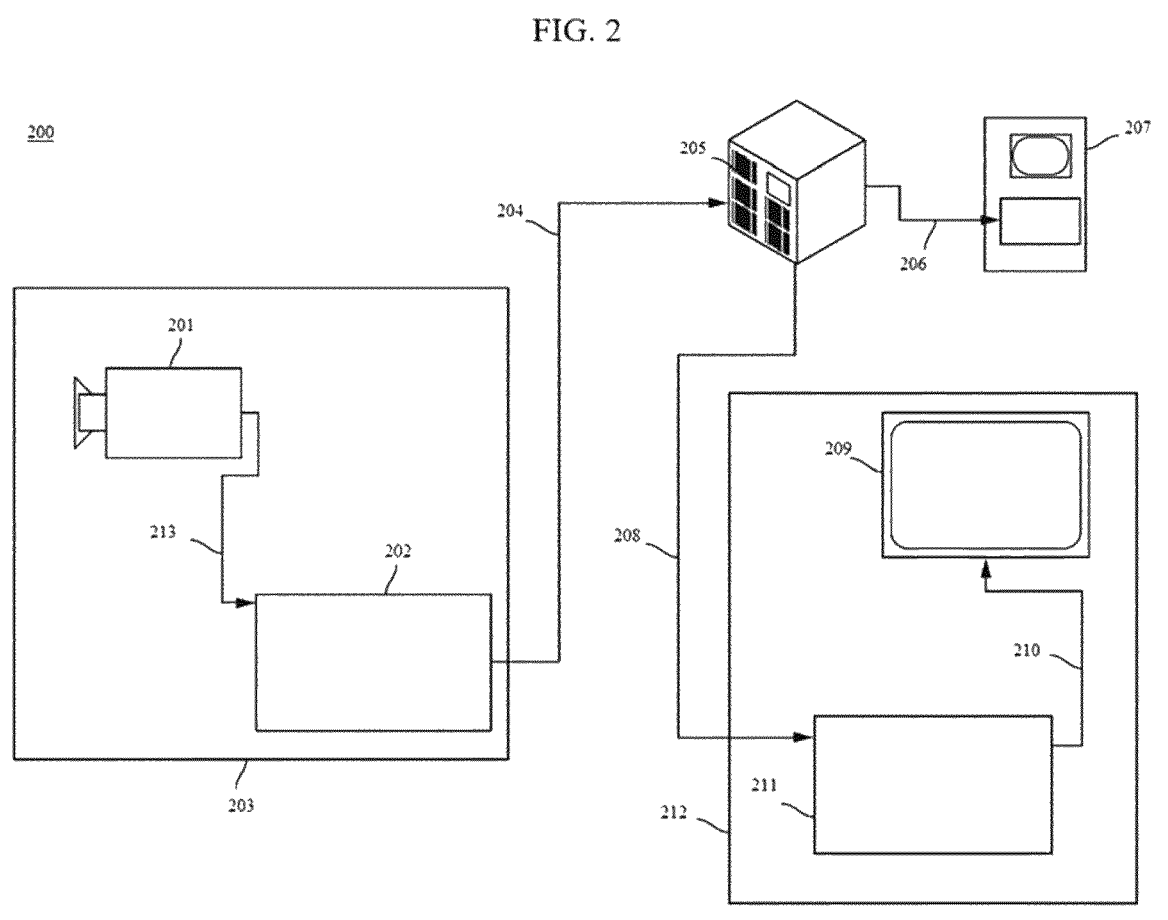

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
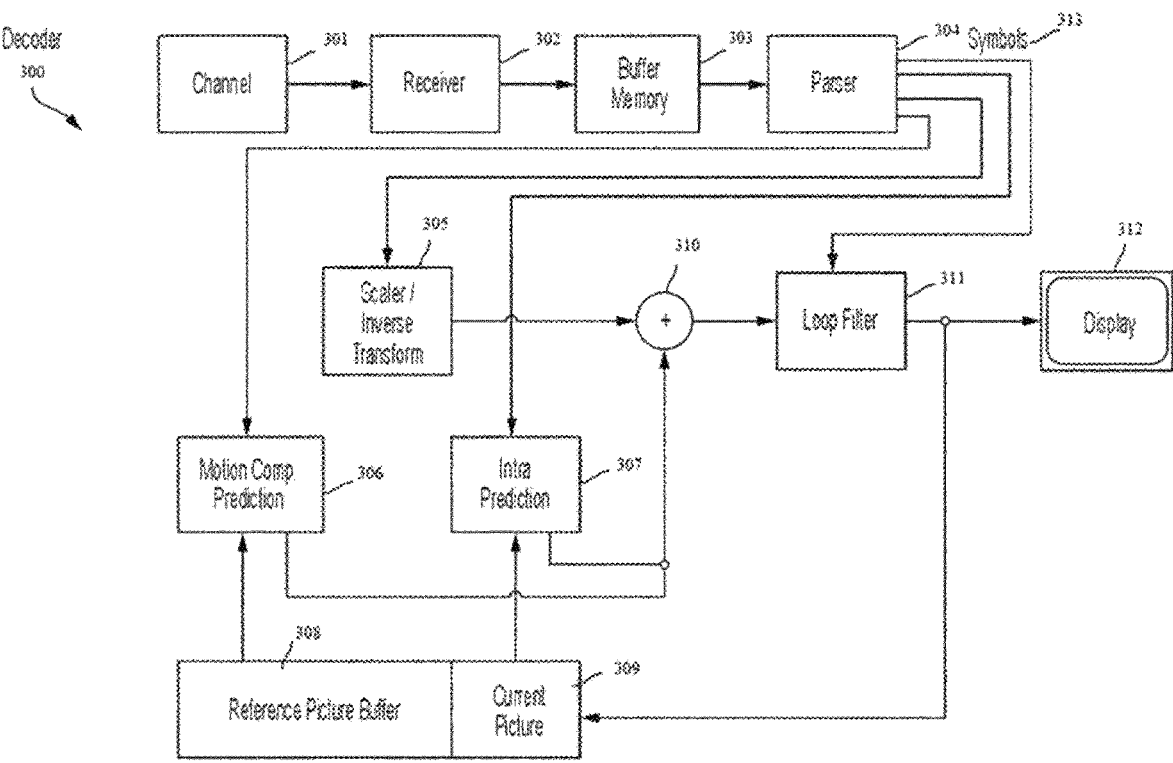
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
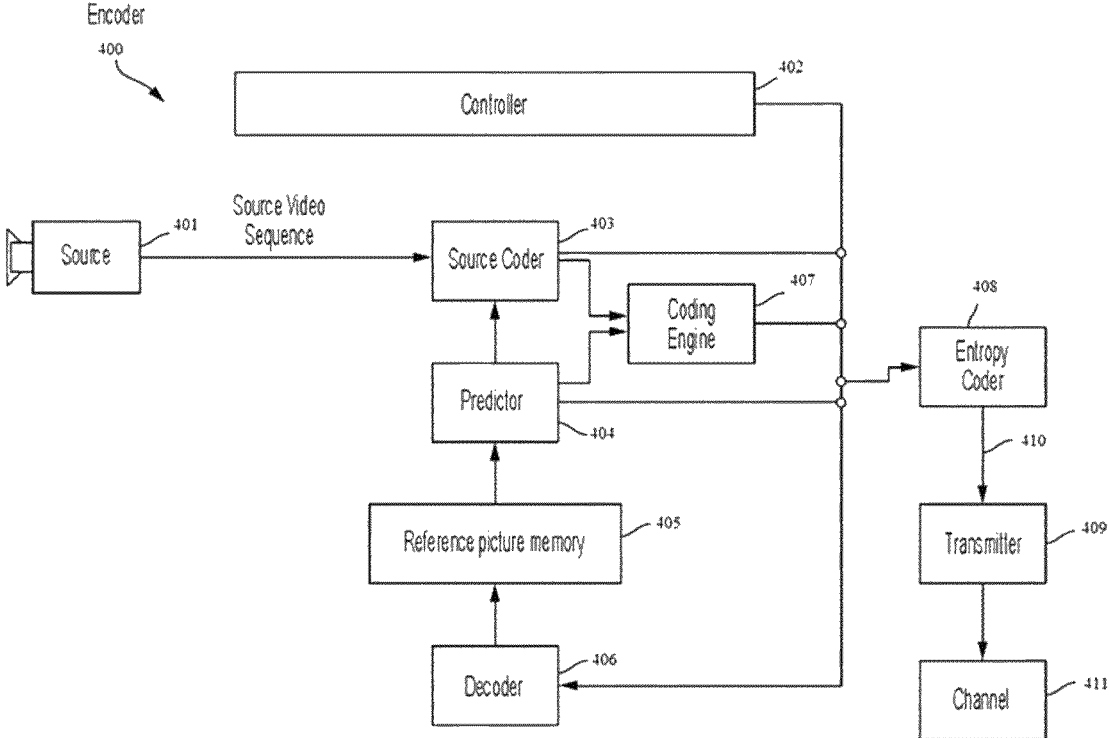
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
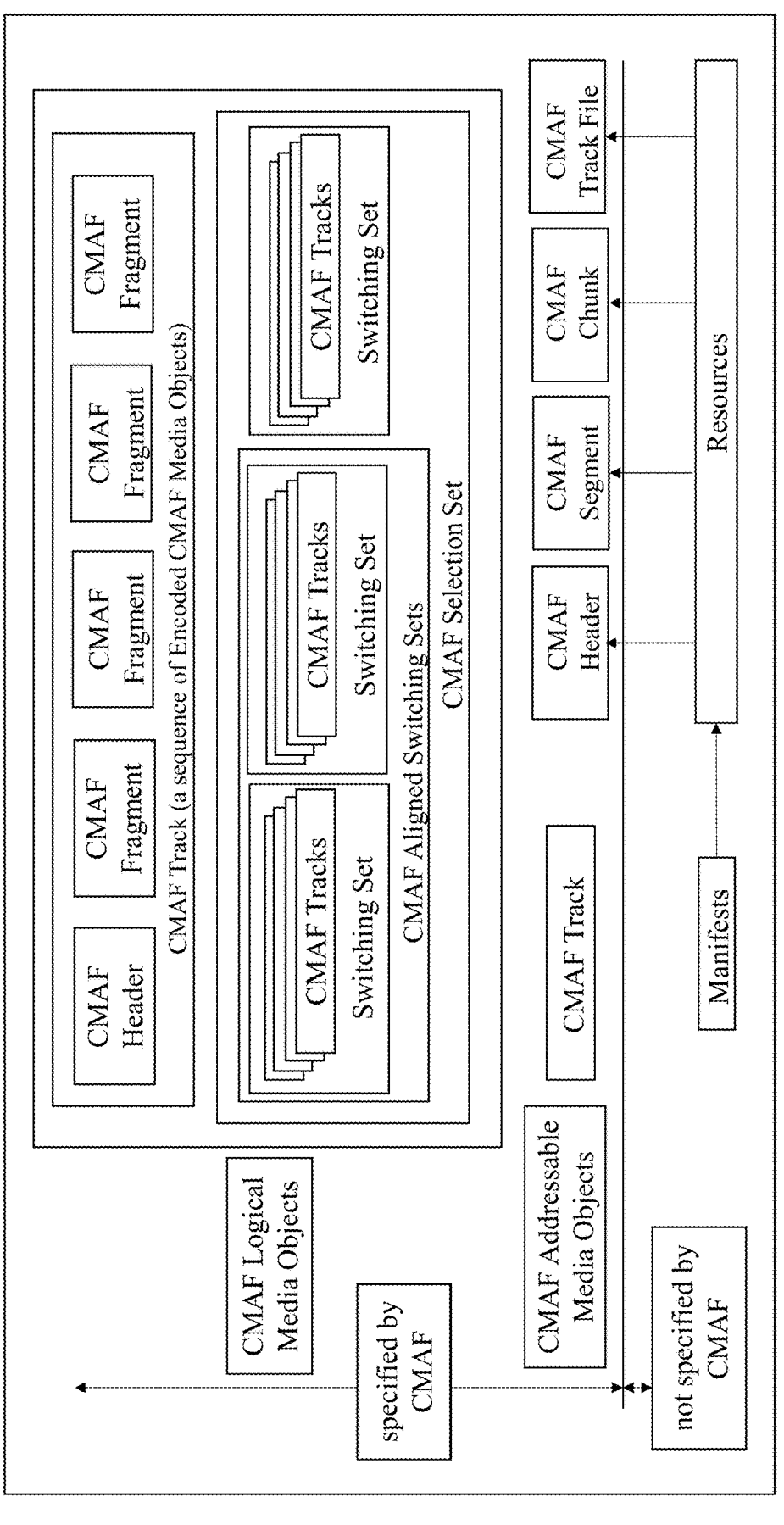
FIG. 5 is a simplified block diagram regarding common media application format (CMAF) features in accordance with embodiments.

FIG. 5 shows an example 500 of the CMAF tracks and CMAF switching sets defined by CMAF, such as with ISO/IEC JTC 1/SC 29/WG03 N00654 or the like, according to exemplary embodiments. A CMAF switching is a set of CMAF tracks that have some common constraints. The main purpose of a CMAF switching set is to provide alternate representations of the same content in multiple tracks so that during the delivery or playback, the player can switch between tracks to accommodate the network bandwidth variation and other varying properties. The CMAF standard uses ISOBMFF for the track formats, but it does not provide a standard to signal the existence of a CMAF switching set in the ISOBMFF file.

Embodiments herein introduce a new version of the ISOBMGG track selection box with unique properties. This new box contains several parameters to signal a CMAF switching set and its properties.

According to embodiments, there is a version 1 switching group which may (i) use switching group id to identify this group, (ii) alternate group id (for selection list), (iii) have switchable group id, (iv) track group id for preselection associations, and (v) indicate CMAF parameters.

Embodiment herein provide the following definition:

Box type: 'tsel'
Container: UserDataBox of the corresponding TrackBox
Mandatory: No
Quantity: Zero or One Such track selection box is contained in the user data box of the track it modifies.

Figure 6:
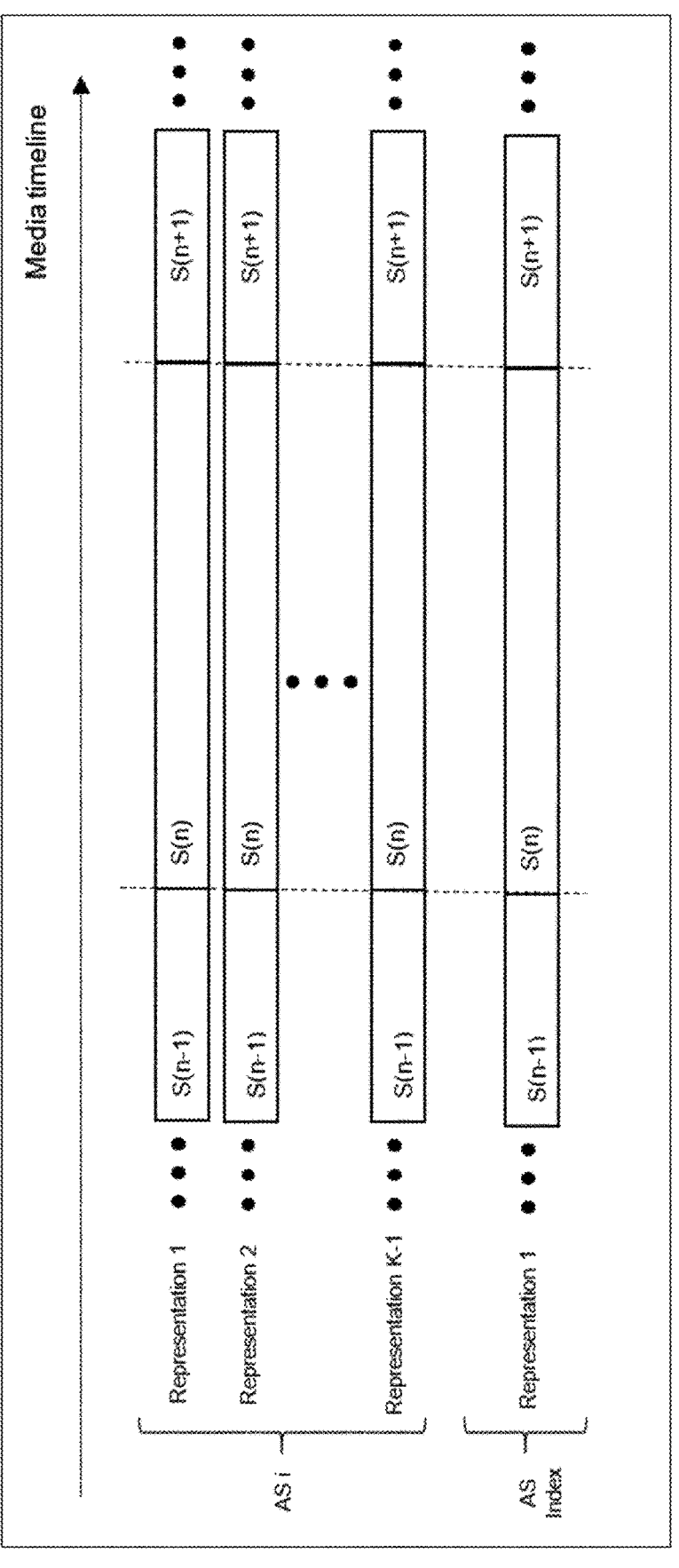
FIG. 6 is a simplified block diagram regarding a Dynamic Adaptive Streaming over HTTP (DASH) environment in accordance with embodiments.

FIG. 6 shows an example 600 for a sample of a metadata track for adaptation set segment indexing such as for any given adaptation set. For example, for each adaptation set (AS) that the instantaneous segment bandwidth is expected to be signaled, a separate adaptation set may also be included in the manifest, as shown in FIG. 6.

As shown in FIG. 6, for an AS i with k media representation that their segments are timed aligned, a new adaptation set AS index is added to the manifest that contains a single representation. This single representation is a timed metadata track that its segments are also timed aligned with the segments of the AS i representations.

Figure 7:
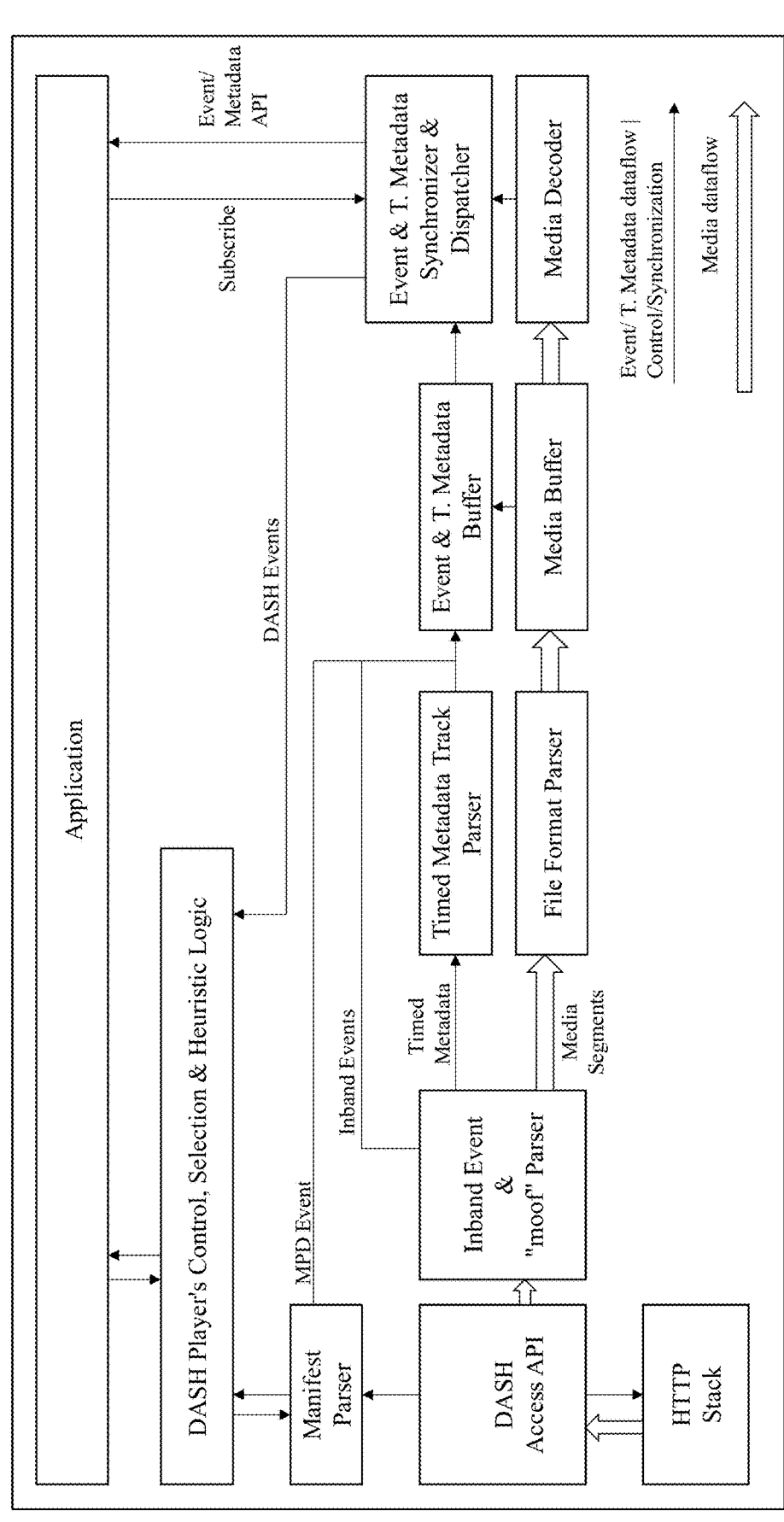
FIG. 7 is a simplified illustration regarding event message features in accordance with embodiments.

FIG. 7 shows a sample DASH client processing model 700, such as of a client sample architecture for processing DASH and Common Media Application Format (CMAF) events, in which a client request of media segments may be based on described addresses in a manifest which also described metadata tracks from which a client may access segments of metadata tracks, parse them, and send them to an application. Further, according to exemplary embodiments, of addresses for media segments such as described below, a DASH manifest may provide addressed for Index segments. Each index segment may provide information about one segment duration and size, and a Representation Index may provide the index information for all segments of a given representation.

A DASH client downloads the MPD and provides information on the existing adaptation sets to the application. The application makes a selection of adaptation sets to stream and provide to the decoder/renderers.

After the selection, the DASH client selects one representation of any selected adaptation sets. It first downloads the initialization segment, Then, based on the general timing of the addressing scheme, requests a specific segment number and schedules the next segment request in the following. It may decide to switch to a different representation due to network bandwidth variation.

Figure 8:
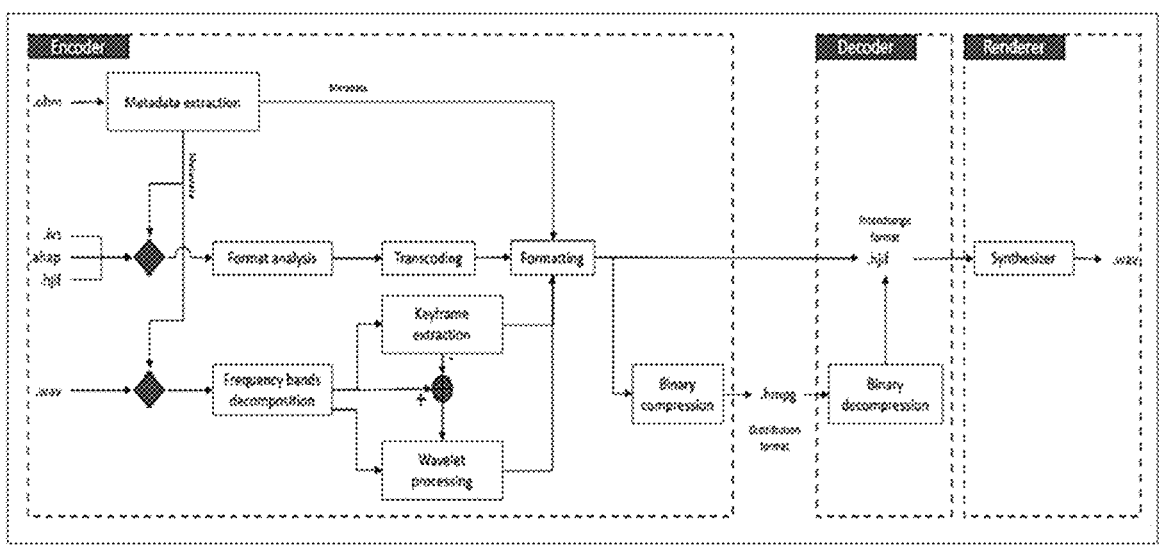
FIG. 8 is a simplified flow diagram in accordance with embodiments.
Figure 9:
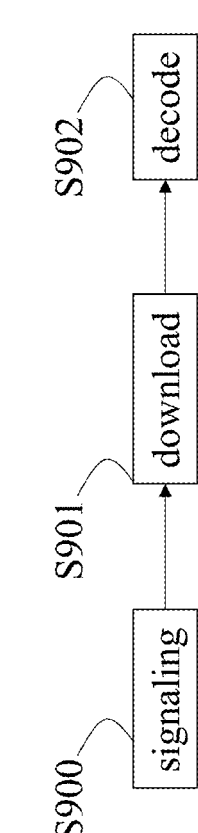
FIG. 9 is a simplified flow diagram in accordance with embodiments.

And FIG. 8 shows an example 800 of a haptic codec architecture according to exemplary embodiments. As is shown in example 900, the haptic encoder generates a binary distribution format (.hmpg) which is compact and efficient for distribution. The haptic decoder can decode such a format and send it to the renderer.

According to embodiments, the haptic data hierarchical structure contains the following levels:

TABLE 1

| Current data hierarchy | Description |
| --- | --- |
| MPEG_haptics | Experience, profile, level |
| Avatars | List of avatars defining the body in the experience: Id, lod, type |
| Perceptions | List of perceptions: Id, modality, description |
| Referenced devices | List of devices: Id, body part mask, technical parameters. |
| Channels | Typically for specific body location: Id, reference device, body part mask, other parameters |
| Bands | Different bands |
| effects | effects |

According to embodiments, there, as in example 900, is signaling by initialization segments, where, the DASH download, at S901, the initialization segments of all representations of adaptation sets and pass them to the application. The application decodes, at S902, the initialization segments which includes the MIHS sample entry, learns about the avatars, perception, channel, and the rest in each AS/representation, and based on that information selects the adaptation set(s) to stream.

And, there is also signaling using principal initializations segments, such as at S900, where to avoid downloading several initialization segments, for each adaptation set, one representation is chosen as the most complete representation. The initialization segment of that representation includes the metadata for representations of that adaptation set. For instance, that initialization segment has the highest profile and level in the adaptation set. That "principal" initialization segment can be downloaded and passed to the application for each adaptation set. Since the application has information on all adaptation sets, it can select the adaptation set(s) to be streamed. In this case, each adaptation set having the principal initialization shall signal it by including @initializationPrincipal according to exemplary embodiments.

According to embodiments, there is provided a selection process, at S901 and S902, where the DASH client downloads/accesses the MPD and parses it, and then it provides the application information about various adaptation sets including the haptics adaptation sets, and then the application requests the download of initialization segments from the haptic adaptation sets (for any adaptation set that has a principal initialization segment, that segment is downloaded, otherwise, all initialization segments of all representations of the adaptation set are downloaded, and the collection of initialization segments is passed to the Application according to embodiments), and then the application parses the initialization segments and derives the metadata information, and then based on that metadata information, the application selects one or more perceptions to render from the list based on the user preferences or application environment, and then the application generates the list of adaptation sets for the perceptions that were selected (it may trim down the adaptation sets list based on the network bandwidth requirement, the complexity of rendering, and other parameters according to embodiments), and then the application provides the list of adaptation sets to the DASH client for streaming, and then if an adaptation set has multiple representations, the DASH client may dynamically adapt between different representations.

And for haptic-supported DASH clients, as according to embodiments herein, to expose the haptic information to the Application, a descriptor scheme for MPEG haptics is defined that can be used with the essential property at the MPD level. The existence of such descriptor means that if the DASH client recognizes the descriptor it has adequate interfaces to expose the haptic selection information to the Application.

As such, by embodiments herein, there is provided signaling haptics configuration information by: providing, to a DASH application, a plurality of initialization segments of representations for a haptic adaptation set in response to determining that the haptic adaptation set does not have a principal initialization segment, and providing, to a DASH application, a principal initialization segment for the haptic adaptation set in response to determining that the haptic adaptation set has the principal initialization segment, and the DASH application parses the principal initialization segment or the plurality of initialization segments and information above avatars, perceptions, channels, and band, and the DASH application subsequently selects a set of the avatars, perceptions, channels, or bands, and n the DASH application selects corresponding haptic adaptation sets or representations that contain the corresponding haptic signals, and based on the principal initialization segment or the plurality of initialization segments, the DASH application subsequently commands a DASH client to stream from the selected haptic adaptation sets or representations.

Haptics experience may be delivered using many tracks. One or more tracks may create a haptic experience. An experience may include multiple perceptions, various device references, multiple avatars to indicate the body parts used for perceptions and different perception modalities, and perception may consist of one or more channels, and a channel may consist of one or more bands. A DASH representation may carry the entire experience, a perception, one or more channels, or one or more bands. Therefore providing enough information for adaptation set/representation selection is essential for DASH streaming of haptic content. Such signaling is not provided by the DASH spec nor the haptics coding or ISOBMFF binding specs.

According to embodiments, there is signaling of the high-level information, such as at S900, where information at haptic adaptation sets is signaled as any of a list of supported avatars (body parts): to identify which body part the AS is addressing and based on the existence of the actuators, the application decides whether to stream the AS or not, and as a list of perception modalities and list of perception id: the modality shows what perception modality is addressed by AS and if the application finds the actuator of the modality, streams the AS. The id is used to relate the other AS which has the same perception id, i.e. carrying the related haptic signals.

That is, in one or more embodiments, there is included the following attributes for the adaptation set: @hapticsAvatars, @hapticPerceptionId, and @hapticPerceptionModality. Each attribute is a white space list of values, defining the body parts, perception ids and modalities, and ids in the adaptation set. The order of values in the perception attribute should be the same.

And in one or more embodiments, there is included a supplemental and/or essential descriptor scheme for haptic information. The value of this descriptor contains the following information: List of avatars, List of presentation modalities, and List of the corresponding perception ids.

Figure 10:
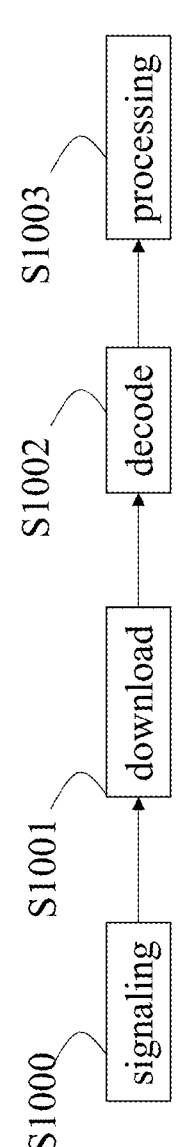
FIG. 10 is a simplified flow diagram in accordance with embodiments.

According to embodiments, there is provided a selection process 1000 of FIG. 10, where the DASH client downloads/accesses, at S1001, the MPD, signaled at S1000, and, at S1002, parses it, and then, as processing at S1003, it provides the application information about various adaptation sets including the haptics adaptation sets, and then the application parses the information regarding avatars, perceptions modalities, and perception ids. (it groups the adaptation sets that belong to the same perception id, as one perception), and then the application compares the avatars, and the perception modalities with the supported ones in the device (based on the availability of the actuators in various body parts, it selects the perception modalities that it can render), and then the application selects one or more perceptions to render from the list based on the user preferences or application environment, and then the application generates the list of adaptation sets for the perceptions that were selected (it may trim down the adaptation sets list based on the network bandwidth requirement, the complexity of rendering (such as the level of battery consumption), and other parameters), and then the application provides the list of adaptation sets to the DASH client for streaming, and then, if an adaptation set has multiple representations, the DASH client may dynamically adapt between different representations.

According to exemplary embodiments, the following information is additionally be signaled at the adaptation set level: list of channels and their body part masks: to identify which body part the AS is addressing with the channel and based on the existence of the actuators, the application decides whether to stream the AS or not.

And, the above information at the mid-level information at the adaptation set may be signaled by defining @hapticChannels with the white-spaced values defining the body parts (note that the @hapticPerceptionId shall be present if @hapticChannels is present according to embodiments) and then adding the channel haptic information to the haptic configuration supplemental/essential descriptor.

According to embodiments, the selection process may be similar to the above features of FIG. 10, but with such additional mid-level information at the adaptation set features, the Application has access to both the high-level and mid-level information for selection.

As such, for the DASH client to expose the haptic information to the Application, a descriptor scheme for MPEG haptics is defined that can be used with the essential property at the MPD level. The existence of such descriptor means that if the DASH client recognizes the descriptor it has adequate interfaces to expose the haptic selection information to the Application. And therefore, by embodiments herein, there is provided a method including signaling, such as at S900 and S1000, high level haptics information and mid level haptics information by including haptic configuration information in a plurality of haptic adaptation sets and representations of a DASH MPD manifest, and the high level haptics information and the mid level haptics information are visible to a DASH application together with a plurality of avatars, perceptions, channels, and band identifiers, and each haptic adaptation set or representation contains the avatars, perceptions, channels, and band identifiers, and the DASH application selects a subset of haptic adaptation sets and representations from available haptic adaptation sets and representations, and the DASH application streams the selected haptic adaptation sets and representations for rendering haptic feedback.

According to embodiments, the signaling, such as at S900 and S1000, may be through an external configuration HJIF file at an adaptation set. For example, an @hapticConfiguration attribute is included for each adaptation set that has a URL to a partial HJIF file according to embodiments. The partial HJIF file may include the metadata in HJIF format for the following levels: avatar, perception, device configurations, channels, and bands. And not all levels are necessary to exist in the file.

The difference between this partial HJIF file and the initialization segment of a representation is that the HJIF is more comprehensive (including multiple representations) and may also include the information that will appear later in the segments.

According to embodiments, the signaling, such as at S900 and S1000, may be at a period and in such case the period includes a @hapticConfiguration attribute that has a URL to an HJIF file. The HJIF file includes the metadata in HJIF format for the following levels for the collection of adaptation sets in the period: avatar, perception, device configurations, channels, and bands. And further in this case, each adaptation set also has @avatarIds, @perceptionIds, @deviceConfigurationIds, @channelIds, and @bandIds which list the ids of each level that the adaptation set includes. The same attributes as above can be used at the representation level if different representations in the same adaptation set have different elements.

According to embodiments, the signaling, such as at S900 and S1000, may be at an MPD, and when at the MPD, the MPD may include a @hapticConfiguration attribute that has a URL to an HJIF file. The HJIF file includes the metadata in HJIF format for the following levels for the collection of adaptation sets of all periods: avatar, perception, device configurations, channels, and bands. In this case, each adaptation set also has @avatarIds, @perceptionIds, @deviceConfigurationIds, @cannelIds, and @bandIds which list the ids of each level that the adaptation set includes. The same attributes as above can be used at the representation level if different representations in the same adaptation set have different elements.

According to embodiments, the signaling, such as at S900 and S1000, may be at a partial HJIF file, and when the partial HJIF file used for the selection process is a HJIF file that has all hierarchical data structure except the effects, such as according to the following Table 2:

TABLE 2

| Partial HJIF configuration file |
| --- |
| MPEG_haptics, which the description and versioning indicating this is a partial HJIF file for the purpose of configuration |
| Avatars |
| Perceptions |
| Referenced devices |
| Channels |
| Bands |

Note that, according to embodiments, the content provider can decide what to be included in the HJIF configuration file. It might have only avatar and perception data but not the rest for instance.

Figure 11:
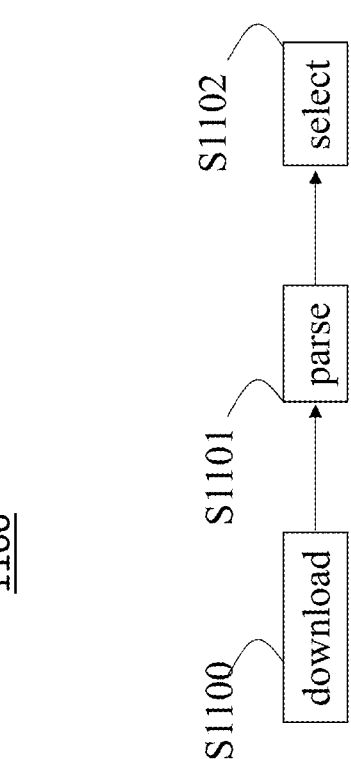
FIG. 11 is a simplified flow diagram in accordance with embodiments.

As in the example 1100 of FIG. 11, a selection process is defined according to exemplary embodiments as the following: at S1100, the DASH client downloads/accesses the MPD and parses it at S1101. And then, at S1102, depending on the level that the link to the HJIF configuration file is provided, one or more HJIF files are downloaded: once at the level of MPD, with any MPD update, once at the beginning of each Period, if it is provided at the period, and once for each adaptation set at the beginning of the period if it is provided at the adaptation set level.

That is, according to embodiments, the application parses the information regarding configurations. It selects the perceptions, channels, and bands to render. The Application finds the relevant adaptation sets (through ids listed in each adaptation set and/or representation) and selects those adaptation sets. The application provides the list of adaptation sets to the DASH client for streaming. And if an adaptation set has multiple representations, the DASH client dynamically adapts between different representations.

And so, there is provided by embodiments herein, for the DASH client to expose the haptic information to the Application, a descriptor scheme for MPEG haptics is defined that can be used with the essential property at the MPD level. The existence of such descriptor means that if the DASH client recognizes the descriptor it has adequate interfaces to expose the haptic selection information to the Application. And therefore, there is provided hereby also a method of: signaling haptics configuration information by providing a link to an HJIF configuration file, and the HJIF configuration file defines the haptics configuration information at a plurality of different levels in a haptic data hierarchy, the haptic data hierarchy including a plurality of avatars, perceptions, channels, and band identifiers for haptic representations, haptic adaptation sets, periods, and/or an MPD, and a DASH client downloads the HJIF configuration file and provides it to a DASH application. The DASH application parses the HJIF configuration file received from the DASH client, and, based on parsed information from the HJIF configuration file, the DASH application selects a subset of perceptions, channels, or bands, wherein, based on initialization segments, the DASH application selects corresponding haptic adaptation sets or representations that contain corresponding haptic signals. And the DASH application subsequently commands the DASH client to stream from the selected haptic adaptation sets and/or representations according to embodiments.

And further, there may also be signaling through embedded HJIF configuration objects used for the selection processes noted above as an HJIF object that may have all hierarchical data structure except the effects for example as follows:

TABLE 3

| HJIF configuration object |
| --- |
| MPEG_haptics, which the description and versioning indicating this is a partial HJIF JSON object for the purpose of configuration |
| Avatars |
| Perceptions |
| Referenced devices |
| Channels |
| Bands |

Note that the content provider can decide what to be included in the HJIF configuration object. It might have only avatar and perception data but not the rest for instance.

As such, embodiments define a haptics configuration attribute that can be used at different levels in MPD. That is, the @hapticConfig attribute is from type xs: string and it contains the base64 encoding of the HJIF configuration object.

And when used at representation, the representation includes a @hapticConf attribute that includes the base64 encoded HJIF configuration object for the adaptation set according to embodiments.

And when used at adaptation set, the adaptation set includes a @hapticConf attribute that includes the base64 encoded HJIF configuration object for the adaptation set.

And when used at period, a period includes a @hapticConf attribute according to embodiments. The base64 encoded HJIF configuration object includes the haptic configuration information for the collection of adaptation sets in the period. And in this case, each adaptation set also has @avatarIds, @perceptionIds, @deviceConfigurationIds, @channelIds, and @bandIds which list the ids of each level that the adaptation set includes according to embodiments. The same attributes as above can be used at the representation level if different representations in the same adaptation set have different elements.

And when used at the MPD, an MPD may include a @hapticConf attribute. The base64 encoded HJIF conf objectf includes the metadata in HJIF format for the following levels for the collection of adaptation sets of all periods: avatar, perception, device configurations, channels, and bands. In this case, each adaptation set also has @avatarIds, @perceptionIds, @deviceConfigurationIds, @cannelIds, and @bandIds which list the ids of each level that the adaptation set includes.

Figure 12:
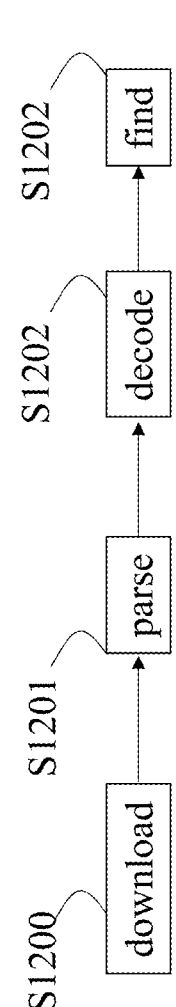
FIG. 12 is a simplified flow diagram in accordance with embodiments.

According to embodiments, such as at example 1200 of FIG. 12, the selection process is defined as the following: at S1200, the DASH client downloads/accesses the MPD and parses it at S1201. And depending on the level that the HJIF config object is provided, one or more HJIF object are base64 decoded at S1202 as: once at the level of MPD, with any MPD update, and once at the beginning of each Period, if it is provided at the period, and also once for each adaptation set at the beginning of the period if it is provided at the adaptation set level.

That is, the application parses the information regarding configurations using the HJIF configuration object(s). It selects the perceptions, channels, and bands it wants to render. The Application, at S1202, finds the relevant adaptation sets (through ids listed in each adaptation set and/or representation) and selects those adaptation sets. The application provides the list of adaptation sets to the DASH client for streaming. And if an adaptation set has multiple representations, the DASH client may dynamically adapt between different representations.

As such, for haptic-supported DASH clients according to such embodiments herein, for the DASH client to expose the haptic information to the Application, a descriptor scheme for MPEG haptics is defined that can be used with the essential property at the MPD level. The existence of such descriptor means that if the DASH client recognizes the descriptor it has adequate interfaces to expose the haptic selection information to the Application. That is, there is provided hereby a method of signaling haptics configuration information by embedding a HJIF configuration object in different levels of DASH manifest or MPD, of which the embedded HJIF configuration object defines a haptics configuration at a plurality of different levels in a haptic data hierarchy, the haptic data hierarchy comprises avatars, perceptions, channels, and bands for haptic representations, haptic adaptation sets, periods, or an MPD. The DASH client downloads the embedded HJIF configuration object as a part of the MPD and provides it to a DASH application, and the DASH application parses the HJIF configuration from the MPD received from the DASH client. Then, the DASH application, based on information about the HJIF configuration, selects a set of perceptions, channels, or bands, and the DASH application, based on a set of initialization segments, selects corresponding haptics adaptation sets or representations that contain corresponding haptic signals. And then the DASH application subsequently commands the DASH client to stream from the selected haptic adaptation sets or representations.

In light of the above, further explanations of relevant data to such embodiments is provided below. For example, starting with haptics info at the MPD, the needed metadata for the MPD is such that, according to exemplary embodiments, the MPD will or must have the following information: (a) the general high-level information of haptics, if it is common in a period or for the entire MPD, (b) information on adaptation sets, to differentiate them for the haptics application, (c) information to differentiate representations of an adaptation set for bandwidth adaptation, and (d) optionally, preselection information that combines multiple adaptation sets to create a preselection presentation.

Therefore, the information carried in MPD depends on the granularity of the adaptation sets as for example, no selection is needed if there is a single haptic adaptation set with the entire experience in MPD, and depending on each adaptation set containing the level of experience, the information needs to be exposed—as shown in Table 3:

TABLE 1

| Possible haptic information at adaptation set level | |
| --- | --- |
| Adaptation set containing | Information |
| 1 or more perceptions 1 or more channels | Perception info Perception and Channel info |

TABLE 1-continued

| Possible haptic information at adaptation set level | |
| --- | --- |
| Adaptation set containing | Information |
| 1 or more bands | Perception and Channel and band info |

And for a format to carry information in MPD according to exemplary embodiments, the metadata information is stored in the HJIF format and ISOBMFF Experience box in a hierarchical manner, while is stored in the MIHS and ISOBMFF configuration box in a flat manner with cross-references. And in the cases that the entire haptic information can be located in one MPD element, for instance, an adaptation set, it seems the hierarchical manner is more compact. However, since there are various ways of grouping the haptic perceptions, channels, and bands in the adaptation sets, a flat manner with references can seem more suitable.

And for flat XML elements, according to embodiments with such solution, similar to MIHS and ISOBMFF Config, the information is stored in the flat elements, referencing each other for associations. Then the shared elements are maintained at a top level, MPD or Period, depending on the scope of metadata, and the adaptation set specific metadata is signaled at each adaptation set level. With a name extension, the haptic element can be present at MPD, Period, and adaptation set elements. The elements the haptic element may contain at each level, depend on the haptic tracks in the adaptation sets. Alternatively, a haptic descriptor (using scheme ID URI) can be defined to include the elements in MPD, Period, and adaptation set elements.

And further semantics and syntax are provided in the tables below according to exemplary embodiments.

TABLE 4

| Haptics Semantics | | |
| --- | --- | --- |
| Element or Attribute Name | Use | Description |
| Haptics | | Haptic description. |
| @xlink:href | O | specifies a reference to a remote element entity that shall contain exactly one element of type Haptics. |
| @xlink:actuate | OD default: 'onRequest' | specifies the processing instructions, which can be either "onLoad" or "onRequest". |
| @id | O | specifies a unique identifier for this Haptics in the scope of the Period. The attribute shall be a unique unsigned integer value in the scope of the containing Period. The attribute shall not be present in a remote element entity. If not present, no identifier for the Adaptation Set is specified. |
| *Experience* | 0 . . . 1 | the haptic experience Specifies metadata. |
| *Perception* | 0 . . . N | the haptic perception Specifies metadata. |
| *Channel* | 0 . . . N | the haptic channel Specifies metadata. |
| *Band* | 0 . . . N | the haptic band Specifies metadata. |
| *EffectLibrary* | 0 . . . N | the haptic library Specifies metadata. |

Key
For attributes:
M = mandatory,
O = optional,
OD = optional with default value,
CM = conditionally mandatory,
F = fixed
For elements: <minOccurs> . . . <maxOccurs> (N = unbounded)
The conditions only hold without using xlink:href. If linking is used, then all attributes are "optional" and <minOccurs = 0>.
Elements are bold; attributes are non-bold and preceded with an @; list of elements and attributes is in italics bold referring to those taken from the Base type that has been extended by this type.

The following table shows how this element is used in various delivery scenarios.

TABLE 5

| Use of haptic element in various scenarios | | |
| --- | --- | --- |
| Adaptation set containing | Haptic element at MPD/Period | Haptic element at adaptation set |
| Entire experience | none | Experience element and optionally others |
| 1 or more perceptions | Experience | Perception elements, and optionally channel and bands. |
| 1 or more channels | Experience and perceptions | Channels and optionally bands |
| 1 or more bands | Experience, perceptions, channels | Bands |

The following tables demonstrate various haptic element semantics.

TABLE 6

Experience Semantics

| Element or Attribute Name | Use | Description |
|---|---|---|
| Experience | | specifies event Stream |
| @xlink:href | O | specifies a reference to an external Experience element |
| @xlink:actuate | OD default: onRequest | specifies the processing instructions, which can be either "onLoad" or "onRequest". This attribute shall not be present if the @xlink:href attribute is not present. |
| @edition | O | the year of the edition and amendment of ISO/IEC 23090-31 that this file conforms to, in the following format: XXXX or XXXX-Y, where XXXX is the year of publication and Y is the amendment number, if any. For this document, the value shall be "2023". |
| @profile | O | name of the profile used to generate the encoded stream according to the profile and level definition in Annex D. |
| @level | O | number of the level used to generate the encoded stream according to the profile and level definition in Annex D. |
| @date | O | the creation date of the haptic experience in human-readable form. The date format shall conform to the ISO 8601 standard. |
| @description | O | a description of the haptic experience. |
| @perceptionCount | O | number of perceptions in the haptic experience. |
| Avatar | 0 . . . N | Avetars descriptions |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

TABLE 7

Avatar Semantics

| Element or Attribute Name | Use | Description | |
|---|---|---|---|
| Avatar | | specifies avatar | |
| @xlink:href | O | specifies a reference to an external Experience element | |
| @xlink:actuate | OD default: onRequest | specifies the processing instructions, which can be either "onLoad" or "onRequest". This attribute shall not be present if the @xlink:href attribute is not present. | |
| @avatarId | M | ID of the avatar. | |
| @levelOfDetail | O | Level of detail of the avatar. | |
| @avatarType | O | | |
| | | Value | Type |
| | | 0 | Custom |
| | | 1 | Vibration |
| | | 2 | Pressure |
| | | 3 | Temperature |
| | | 4-255 | Reserved |
| @meshUri | O | URI to the custom mesh file. Only present if avatarType is custom. | |

TABLE 7-continued

| Avatar Semantics | | |
|---|---|---|
| Element or Attribute Name | Use | Description |
| @description | O | Description of avatar |
| @perceptionCount | O | Exists only if @avatarType = 0 |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

TABLE 8

| Perception Semantics | | |
|---|---|---|
| Element or Attribute Name | Use | Description |
| Perception | | specifies perception |
| @xlink:href | O | specifies a reference to an external Perception element |
| @xlink:actuate | OD default: onRequest | specifies the processing instructions, which can be either "onLoad" or "onRequest". This attribute shall not be present if the @xlink:href attribute is not present. |
| @id | M | ID of the perception in the haptic experience. The value shall be equal to or greater than zero. |
| @description | O | Description of the perception. |
| @perceptionModality | O | |

| | | Value | Modality |
|---|---|---|---|
| | | 0 | Other |
| | | 1 | Pressure |
| | | 2 | Acceleration |
| | | 3 | Velocity |
| | | 4 | Position |
| | | 5 | Temperature |
| | | 6 | Vibrotactile |
| | | 7 | Water |
| | | 8 | Wind |
| | | 9 | Force |
| | | 10 | Vibrotactile texture |
| | | 11 | Electrotactile |
| | | 12 | Stiffness |
| | | 13 | Friction |
| | | 14 | Humidity |
| | | 15 | User-define temporal |
| | | 16 | User-defined spatial |
| | | 17-255 | Reserved |

| Element or Attribute Name | Use | Description |
|---|---|---|
| @avatarId | O | Unique ID of the associated avatar body model defined. The O value means that no avatar specified. |
| @effectLibraryCount | O | number of effects in the perception's effect library. |
| @unitExponent | O | Refers to the 10x exponent for the SI unit of effect position and keyframe positions of spatial modalities. |
| @perceptoionUnitExponent | O | Refers to the 10x exponent for the SI unit of effect position and keyframe positions of spatial modalities. |
| @channelCount | O | The number of channels in this perception. |
| referenceDevice | 0 . . . N | Reference devices. |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

TABLE 9

| | | ReferenceDevice Semantics |
| --- | --- | --- |
| Element or Attribute Name | Use | Description |
| ReferenceDevice | | specifies reference device |
| @xlink:href | O | specifies a reference to an external Perception element |
| @xlink:actuate | OD default: onRequest | specifies the processing instructions, which can be either "onLoad" or "onRequest". This attribute shall not be present if the @xlink:href attribute is not present. |
| @id | M | Unique ID of the channel in the perception containing the channel. The value shall be equal to or greater than zero. |
| @name | O | Name of the reference device. |
| @bodyPartMask | O | Binary mask specifying the location of the device on the human body according to subclause 5.6 and Table 7. |
| @optionalFieldMask | O | Binary mask for the optional parameters of the reference device. |
| @maximumFrequency | O | Maximum frequency of the actuator in Hertz. The range of this decimal number is [0, 10000]. Present only if optionalFieldMask & 0x00'01 is true. |
| @minimumFrequency | O | Minimum frequency of the actuator in Hertz. The range of this decimal number is [0, 10000]. Present only if optionalFieldMask & 0x00'02 is true. |
| @resonanceFrequency | O | Resonance frequency of the actuator in Hertz. The range of this decimal number is [0, 10000]. Present only if optionalFieldMask & 0x00'04 is true. |
| @maximumAmplitude | O | Maximum amplitude of the device according to the perception_modality. The range of this decimal number is [0, 10000]. Present only if optionalFieldMask & 0x00'08 is true. |
| @impedance | O | Impedance of the actuator in Ohms. The range of this decimal number is [0, 10000]. Present only if optionalFieldMask & 0x00'10 is true. |
| @maximumVoltage | O | Maximum voltage of the actuator. The range of this decimal number is [0, 10000]. Present only if optionalFieldMask & 0x00'20 is true. |
| @maximumCurrent | O | Maximum current of the actuator in Amperes. The range of this decimal number is [0, 10000]. Present only if optionalFieldMask & 0x00'40 is true. |
| @maximumDisplacement | O | Maximum displacement of the actuator in millimeters. The range of this decimal number is [0, 10000]. Present only if optionalFieldMask & 0x00'80 is true. |
| @weight | O | Weight of the device in kilograms. The range of this decimal number is [0, 10000]. Present only if optionalFieldMask & 0x01'00 is true. |
| @size | O | Size of the device in millimetres. The range of this decimal number is [0, 10000]. Present only if optionalFieldMask & 0x02'00 is true. |
| @custom | O | Custom data. The range of this decimal number is [−10000, 10000]. Present only if optionalFieldMask & 0x04'00 is true. |
| @type | O | Type of actuator, present only if optionalFieldMask & 0x08'00 is true. Table 41 lists the possible values for type. |

| Table 41 - Value of type | |
| --- | --- |
| Value | Meaning |
| 0 | Unknown |
| 1 | LRA |
| 2 | VCA |
| 3 | ERM |
| 4 | Piezo |
| 5-15 | /* reserved */ |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

TABLE 10

| Element or Attribute Name | Use | Description |
|---|---|---|
| Channel | | specifies channel |
| @xlink:href | O | specifies a reference to an external Channel element |
| @xlink:actuate | OD default: onRequest | specifies the processing instructions, which can be either "onLoad" or "onRequest". This attribute shall not be present if the @xlink:href attribute is not present. |
| @id | M | Unique ID of the channel in the perception containing the channel. The value shall be equal to or greater than zero. |
| @perceptionId | M | ID of the perception to which the channel is attached. |
| @description | O | Description of the channel. |
| @deviceId | O | ID of the associated device. For unspecified devices, the value shall be 0. |
| @gain | O | Gain associated with the channel. The range of this decimal number is [−10000, 10000]. |
| @mixingWeight | O | Mixing weight of the channel. The range of this decimal number is [0, 10000]. |
| @optionalMetadataaMask | O | Binary mask to define if optional information is stored or not. |
| @bodyPartMask | O | Binary mask specifying body parts on which to apply the effect body according to subclause 5.6 and Table 7. |
| @trackResolutionX | O | Reference actuator resolution used to design the haptic experience for each spatial coordinate (X, Y, Z). |
| @trackResolutionY | O | Reference actuator resolution used to design the haptic experience for each spatial coordinate (X, Y, Z). |
| @trackResolutionZ | O | Reference actuator resolution used to design the haptic experience for each spatial coordinate (X, Y, Z). |
| @numBodyPartTargets | O | Number of actuatorTarget in the channel |
| @bodyPartTarget | O | List of different actuators targeted by the channel and identified by its coordinates (X, Y, Z). |
| @numActuatorTargets | O | Number of actuatorTarget in the channel |
| @ActuatorTargetX | O | List of different actuators targeted by the channel and identified by its coordinates (X, Y, Z). |
| @ActuatorTargetY | O | List of different actuators targeted by the channel and identified by its coordinates (X, Y, Z). |
| @ActuatorTargetZ | O | List of different actuators targeted by the channel and identified by its coordinates (X, Y, Z). |
| @samplingFrequency | O | Sampling frequency of the original encoded signal in Hertz. |
| @sampleCount | O | Sample count of the original encoded signal. Present only if frequencySampling is greater than zero. |
| @directionX | O | Spatial direction of the encoded signal. This value is based on a local representation of the 3D space given by the presentation engine. |
| @directionY | O | Spatial direction of the encoded signal. This value is based on a local representation of the 3D space given by the presentation engine. |
| @directionZ | O | Spatial direction of the encoded signal. This value is based on a local representation of the 3D space given by the presentation engine. |
| @vertexCount | O | Number of vertices in the vertices list. |
| @vertex | O | List of vertices on the avatar representation affected by the effect. |
| @bandCount | | Number of bands associated with the channel. |

Key

For attributes:

M = mandatory,

O = optional,

OD = optional with default value,

CM = conditionally mandatory

For elements: <minOccurs> . . . <maxOccurs> (N = unbounded)

Elements are bold; attributes are non-bold and preceded with an @.

TABLE 11

Band Semantics

| Element or Attribute Name | Use | Description |
|---|---|---|
| Band | | specifies band |
| @xlink:href | O | specifies a reference to an external Band element |
| @xlink:actuate | OD default: onRequest | specifies the processing instructions, which can be either "onLoad" or "onRequest". This attribute shall not be present if the @xlink:href attribute is not present. |
| @id | M | Unique ID of the band in the channel containing the band. |
| @perceptionId | M | ID of the perception to which the band belongs. |
| @channelId | M | ID of the channel to which the band belongs. |
| @bandTypes | O | |

| | | Value | Type |
|---|---|---|---|
| | | 0 | Transient |
| | | 1 | Curve |
| | | 2 | Vectorial wave |
| | | 3 | Wavelet wave |
| | | 4-7 | Reserved |

@curveTypes

| | | Value | Type |
|---|---|---|---|
| | | 0 | Unknown |
| | | 1 | Cubic |
| | | 2 | Linear |
| | | 3 | Akima |
| | | 4 | Bezier |
| | | 5 | B-spline |
| | | 6-15 | Reserved |

| Element or Attribute Name | Use | Description |
|---|---|---|
| @blockLengthLog | O | The blockLength is coded in samples instead of milliseconds for the binary format, allowing a more compact representation. Additionally, it is transformed to the logarithmic domain using the formula $blockLength\_log = log_2(blockLength) - 4$. This leads to an allowed minimum blockLengthLog of 16 and only powers of 2 in samples, which is required for wavelet coding. |
| @lowerFrequencyLimit | O | Lower frequency limit of the band in Hertz. The range of this decimal number is [0, 10000]. |
| @upperFrequencyLimit | O | Upper frequency limit of the band in Hertz. The range of this decimal number is [0, 10000]. |
| @effectCount | O | Number of effects present in the band. |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

TABLE 12

EffectLibrary Semantics

| Element or Attribute Name | Use | Description |
|---|---|---|
| EffectLibrary | | specifies effect libaray |
| @xlink:href | O | specifies a reference to an external EffectLibrary element |
| @xlink:actuate | OD default: onRequest | specifies the processing instructions, which can be either "onLoad" or "onRequest". This attribute shall not be present if the @xlink:href attribute is not present. |
| @id | M | ID of the effect in the library. The value shall be unique in the perception. |
| @position | O | Position of the effect, relative to the position of the calling effect. |

TABLE 12-continued

EffectLibrary Semantics

| Element or Attribute Name | Use | Description |
| --- | --- | --- |
| @hasSemantic | O | Flag signalling the presence of a semantic keyword for the current effect. Value 0 means no semantic is included. |
| @semanticKeywords | O | Semantic keyword as defined in subclause 5.8. |
| @phaseS | O | Phase of the effect. |
| @baseSignal | O | Base signal of the effect. Table 48 lists the possible values for baseSignal. |

Table 48 - Value of @baseSignal

| Value | Meaning |
| --- | --- |
| 0 | Sine |
| 1 | Square |
| 2 | Triangle |
| 3 | Sawtooth up |
| 4 | Sawtooth down |
| 5-15 | /* reserved */ |

| | | |
| --- | --- | --- |
| @effectType | O | Type of the effect. Table 49 lists the possible values for effectType. |

Table 49 - Value of @effectType

| Value | Meaning |
| --- | --- |
| 0 | Basis |
| 1 | Reference |
| 2 | Composite |
| 3 | /* reserved*/ |

| | | |
| --- | --- | --- |
| @keyframesCount | O | Number of keyframes in the effect. |
| @mask | O | Information mask indicating which keyframe parameters are present. |
| @relativePosition | O | Keyframe position relative to the effect position, present only if mask & 0x001 is true. |
| @amplitude | O | Keyframe amplitude, present only if mask & 0x010 is true. |
| @frequency | O | Keyframe frequency in Hertz, present only if mask & 0x100 is true. |
| @compositeEffectCount | O | Number of effects comprising the composite effect. |

Key
For attributes:
M = mandatory,
O = optional,
OD = optional with default value,
CM = conditionally mandatory
For elements: <minOccurs> . . . <maxOccurs> (N = unbounded)
Elements are bold; attributes are non-bold and preceded with an @.

As such, by embodiments herein, there is provided a method of signaling haptics configuration information by including the haptic XML element consists of multiple subelements for perceptions, channels, bands and effect libraries with a flat structure and cross-referencing other sub-elements to show associations. Depending on the nature of adaptation set tracks, the adaptation set element can carrying the haptic element for the entire experience, or for one or more perception, of for one or more channels, or for more one or more bands. And depending the commonality of data, the haptic metadata information in included in different levels of MPD, the common ones at MPD if the common data is not changing for entire MPD, or at the Period level if some periods do not haptic tracks, and then at each adaptation set that has haptic content, the haptic element is present with the elements that indicate the metadata that is specific to that adaptation set, whether it is one or more perception, one or more channels, or one or more bands.

The techniques described above, can be implemented as computer software using computer-readable instructions and physically stored in one or more computer-readable media or by a specifically configured one or more hardware processors. For example, FIG. 13 shows a computer system 1300 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 13 for computer system 1300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, joystick 1305, microphone 1306, scanner 1308, camera 1307.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, or joystick 1305, but there can also be tactile feedback devices that do not serve as input devices), audio output devices (such as: speakers 1309, headphones (not depicted)), visual output devices (such as screens 1310 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1300 can also include human accessible storage devices and their associated media such as optical media including CD/DVD ROM/RW 1320 with CD/DVD 1311 or the like media, thumb-drive 1322, removable hard drive or solid state drive 1323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1300 can also include interface 1399 to one or more communication networks 1398. Networks 1398 can for example be wireless, wireline, optical. Networks 1398 can further be local, wide-area, metropolitan, vehicular and industrial, real-time, delay-tolerant, and so on. Examples of networks 1398 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1398 commonly require external network interface adapters that attached to certain general-purpose data ports or peripheral buses (1350 and 1351) (such as, for example USB ports of the computer system 1300; others are commonly integrated into the core of the computer system 1300 by attachment to a system bus as described below (for example Ethernet interface into a PC computer system or cellular network interface into a smartphone computer system). Using any of these networks 1398, computer system 1300 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1340 of the computer system 1300.

The core 1340 can include one or more Central Processing Units (CPU) 1341, Graphics Processing Units (GPU) 1342, a graphics adapter 1317, specialized programmable processing units in the form of Field Programmable Gate Areas (FPGA) 1343, hardware accelerators for certain tasks 1344, and so forth. These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 can be accessible in the form of one or more physical plugs to enable extensions by additional CPUs, GPU, and the like. The peripheral devices can be attached either directly to the core's system bus 1348, or through a peripheral bus 1351. Architectures for a peripheral bus include PCI, USB, and the like.

CPUs 1341, GPUs 1342, FPGAs 1343, and accelerators 1344 can execute certain instructions that, in combination, can make up the aforementioned computer code. That computer code can be stored in ROM 1345 or RAM 1346. Transitional data can be also be stored in RAM 1346, whereas permanent data can be stored for example, in the internal mass storage 1347. Fast storage and retrieval to any of the memory devices can be enabled through the use of cache memory, that can be closely associated with one or more CPU 1341, GPU 1342, mass storage 1347, ROM 1345, RAM 1346, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1300, and specifically the core 1340 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1340 that are of non-transitory nature, such as core-internal mass storage 1347 or ROM 1345. The software implementing various embodiments of the present disclosure can be stored in such devices and executed by core 1340. A computer-readable medium can include one or more memory devices or chips, according to particular needs. The software can cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system can provide functionality as a result of logic hardwired or otherwise embodied in a circuit (for example: accelerator 1344), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing haptics media, the method being performed by at least one processor, the method, by a dynamic adaptive streaming over hypertext transfer protocol (HTTP) (DASH) application implemented by the at least one processor, comprising:

providing, by the DASH application and to a DASH client, a request for one or more initialization segments from haptic adaptation sets, the request indicating that:

for a haptics adaptation set of the haptic adaptation sets having a principal initialization segment, only the principal initialization segment is to be downloaded, the principal initialization segment being indicated as having a highest profile and level among other initialization segments of the haptics adaptation set, and for any other haptics adaptation set of the haptic adaptation sets not having the principal initialization segment, all initialization segments of all representations of that any other haptics adaptation set is to be downloaded, receiving, from the DASH client, a media file, comprising haptics indicated by an adaptation set of a DASH media presentation description (MPD) manifest, and the one or more initialization segments of representations of a haptics adaptation set, the adaptation set is the haptics adaptation set, the media file indicates a haptics interchange format (HJIF) configuration file to the DASH application;

parsing, by the DASH client, the one or more initialization segments and any of avatars, perceptions, channels, and band identifiers, of the haptics based on the HJIF configuration file;

selecting a subset of the haptic adaptation sets, including the adaptation set based on parsing any of the avatars, the perceptions, the channels and the band identifiers; and streaming and rendering, in DASH, haptic feedbacks of the media file based on the selected subset of the haptic adaptation sets based on commanding the DASH client to stream from the selected haptics adaptation sets.

2. The method according to claim 1, wherein the media file further indicates the haptics by referencing a link to the HJIF file.

3. The method according to claim 1, wherein the media file further indicates the haptics by a haptics interchange format (HJIF) configuration object.

4. A apparatus for haptics processing a dynamic adaptive streaming over hypertext transfer protocol (HTTP) (DASH) application implemented by the at least one processor, the apparatus comprising:

at least one memory configured to store computer program code; and the at least one processor which is configured to access the computer program code and operate as instructed by the computer program code, the computer program code including:

code configured to cause the at least one processor to provide, by the DASH application and to a DASH client, a request for one or more initialization segments from haptic adaptation sets, the request indicating that:

for a haptics adaptation set of the haptic adaptation sets having a principal initialization segment, only the principal initialization segment is to be downloaded, the principal initialization segment being indicated as having a highest profile and level among other initialization segments of the haptics adaptation, and for any other haptics adaptation set of the haptic adaptation sets not having the principal initialization segment, all initialization segments of all representations of that any other haptics adaptation set is to be downloaded, receiving code configured to cause the at least one processor to receive, from the DASH client, a media file comprising haptics indicated by an adaptation set of a DASH media presentation description (MPD) manifest, and the one or more initialization segments of representations of a haptics adaptation set, the adaptation set is the haptics adaptation set, the media file indicates a haptics interchange format (HJIF) configuration file to the DASH application;

parsing code configured to cause the at least one processor to parse, by the DASH client, the one or more initialization segments and any of avatars, perceptions, channels, and band identifiers, of the haptics based on the HJIF configuration file;

selecting code configured to cause the at least one processor to select a subset of the haptic adaptation sets, including the adaptation set based on parsing any of the avatars, the perceptions, the channels and the band identifiers; and streaming and rendering code configured to cause the at least one processor to stream and render, in DASH, haptic feedbacks of the media file based on the selected subset of the haptic adaptation sets based on commanding the DASH client to stream from the selected haptics adaptation sets.

5. The apparatus according to claim 4, wherein the media file further indicates the haptics by referencing a link to the HJIF file.

6. The apparatus according to claim 4, wherein the media file further indicates the haptics by a haptics interchange format (HJIF) configuration object.

7. A non-transitory computer readable medium storing a program causing a computer to execute a process, by a dynamic adaptive streaming over hypertext transfer protocol (HTTP) (DASH) application implemented by the computer, the process comprising:

providing, by the DASH application and to a DASH client, a request for one or more initialization segments from haptic adaptation sets, the request indicating that:

for a haptics adaptation set of the haptic adaptation sets having a principal initialization segment, only the principal initialization segment is to be downloaded, the principal initialization segment being indicated as having a highest profile and level among other initialization segments of the haptics adaptation, and for any other haptics adaptation set of the haptic adaptation sets not having the principal initialization segment, all initialization segments of all representations of that any other haptics adaptation set is to be downloaded, receiving, from the DASH client, a media file comprising haptics indicated by an adaptation set of a DASH media presentation description (MPD) manifest, and the one or more initialization segments of representations of a haptics adaptation set, the adaptation set is the haptics adaptation set, the media file indicates a haptics interchange format (HJIF) configuration file to the DASH application;

parsing, by the DASH client, the one or more initialization segments and any of avatars, perceptions, channels, and band identifiers, of the haptics based on the HJIF configuration file;

selecting a subset of the haptic adaptation sets, including the adaptation set based on parsing any of the avatars, the perceptions, the channels and the band identifiers; and streaming and rendering, in DASH, haptic feedbacks of the media file based on the selected subset of the haptic adaptation sets based on commanding the DASH client to stream from the selected haptics adaptation sets.

8. The non-transitory computer readable medium according to claim 7, wherein the media file further indicates the haptics by referencing a link to the HJIF file.

* * * * *